US010069325B2

(12) United States Patent
Hyun (10) Patent No.: US 10,069,325 B2
(45) Date of Patent: Sep. 4, 2018

(54) RECEIVER WIRELESS CHARGING AND SUPPORT DEVICE

(71) Applicant: Samsung Electro-Mechanics Co., Ltd., Suwon-si (KR)

(72) Inventor: Ji Ho Hyun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 262 days.

(21) Appl. No.: 15/041,146

(22) Filed: Feb. 11, 2016

(65) Prior Publication Data

US 2016/0365745 A1    Dec. 15, 2016

(30) Foreign Application Priority Data

Jun. 12, 2015  (KR) .................. 10-2015-0083468
Sep.  1, 2015  (KR) .................. 10-2015-0123825

(51) Int. Cl.
*H02J 7/00* (2006.01)
*H02J 7/02* (2016.01)
*H02J 50/10* (2016.01)

(52) U.S. Cl.
CPC ............ *H02J 7/025* (2013.01); *H02J 7/0044* (2013.01); *H02J 50/10* (2016.02)

(58) Field of Classification Search
CPC .......... H02J 7/025; H02J 50/10; H02J 7/0044; H02J 7/0042
USPC ........................................................ 320/108
See application file for complete search history.

(56) References Cited

U.S. PATENT DOCUMENTS

| 8,816,636 | B2 * | 8/2014 | Shinde | ...................... | B60R 7/04 |
| | | | | | 320/108 |
| 2003/0148740 | A1 * | 8/2003 | Yau | ........................ | H02J 7/0044 |
| | | | | | 455/575.1 |
| 2010/0102777 | A1 * | 4/2010 | Sa | .......................... | H02J 7/0044 |
| | | | | | 320/115 |
| 2013/0324198 | A1 * | 12/2013 | Lachnitt | .............. | H04M 1/0202 |
| | | | | | 455/575.9 |
| 2015/0093922 | A1 * | 4/2015 | Bosscher | ............. | H01R 13/665 |
| | | | | | 439/39 |

(Continued)

FOREIGN PATENT DOCUMENTS

JP    2013-169129 A    8/2013
JP    2014-230026 A    12/2014
(Continued)

OTHER PUBLICATIONS

Korean Office Action dated May 4, 2016 in counterpart Korean Application No. 10-2015-0123825 (pp. 1-7 in English; pp. 8-12 in Korean).

*Primary Examiner* — Nathaniel Pelton
(74) *Attorney, Agent, or Firm* — NSIP Law (57) ABSTRACT

A wireless charging device for a vehicle includes an external cover rotatably coupled to an interior member of the vehicle and including a wireless charging circuit formed therein, an internal cover coupled to a surface of the external cover and including an accommodation space configured to position a power receiving device with respect to the wireless charging circuit to receive power transmitted by the wireless charging circuit, and at least one auxiliary cover inserted into the accommodation space and configured to reduce the size of the accommodation space to inhibit movement of the power receiving device.

18 Claims, 7 Drawing Sheets

(56) References Cited

U.S. PATENT DOCUMENTS

2016/0149433 A1* 5/2016 Hopper ................ H02J 7/025
  320/108
2016/0276865 A1* 9/2016 Pike ................ B60R 11/0241

FOREIGN PATENT DOCUMENTS

KR   10-2010-0133557 A   12/2010
KR   10-2015-0032080 A    3/2015

* cited by examiner

RECEIVER WIRELESS CHARGING AND SUPPORT DEVICE

CROSS-REFERENCE TO RELATED APPLICATION(S)

This application claims the benefit of Korean Patent Application Nos. 10-2015-0083468 filed on Jun. 12, 2015 and 10-2015-0123825 filed on Sep. 1, 2015 in the Korean Intellectual Property Office, the entire disclosures of which are incorporated herein by reference for all purposes.

BACKGROUND

1. Field

The following description relates to a wireless charging device for a vehicle, in which a portable terminal is stably mounted.

2. Description of Related Art

In general, most wireless communications devices need to be charged, and thus recently developed portable devices have different types of wired connectors.

Methods for charging a battery provided in a portable terminal with electrical energy generally provide a terminal connection method for receiving commercially-available alternating current (AC) power, converting the AC power into a current having a voltage appropriate to charge a battery, and supplying electrical energy through a terminal of the corresponding battery. Wireless charging technology heretofore generally employed a method using magnetic resonance and magnetic induction methods. Non-contact wireless charging technology using the magnetic induction method has rapidly become popular.

Meanwhile, in the case of a wireless charging device used in a vehicle, a portable terminal may be separated from a charging non-contact holder due to a shock or shaking during driving. Accordingly, there is a need for a device to more stably hold a portable terminal and wirelessly charge the portable terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one aspect, a wireless charging device for a vehicle, includes: an external cover rotatably coupled to an interior member of the vehicle and including a wireless charging circuit formed therein; an internal cover coupled to a surface of the external cover and including an accommodation space configured to position a power receiving device with respect to the wireless charging circuit to receive power transmitted by the wireless charging circuit; and at least one auxiliary cover inserted into the accommodation space configured to reduce the size of the accommodation space to inhibit movement of the power receiving device.

A plurality of auxiliary covers may be configured responsive to a thickness of the power receiving device in the accommodation space.

The wireless charging device may further include a cover coupler configured to retain reserved auxiliary covers not disposed in the accommodation space, the cover coupler may be formed on an external surface of the internal cover.

The wireless charging device may further include a magnet or metal member having a shape substantially the same as the auxiliary cover disposed on the cover coupler; and the auxiliary cover may be attached to the cover coupler according to magnetic attraction.

A magnet or metal member may be disposed on a contact surface of the auxiliary cover, contacting the cover coupler.

The auxiliary cover may be formed to have a similar shape to that of the internal cover and include a first auxiliary cover, and a second auxiliary cover formed to have a size able to be accommodated in an internal space of the first auxiliary cover.

The first auxiliary cover may have an internal space in planar contact with an external surface of the second auxiliary cover when the second auxiliary cover is accommodated in the internal space of the first auxiliary cover.

The internal cover and the auxiliary cover may each have an internal surface on which a buffer member is disposed.

The wireless charging device may further include a magnetic portion attached to the internal cover or an internal surface of the auxiliary cover.

The magnetic portion may be formed of a ferrite sheet.

The wireless charging circuit may include a coil portion including at least one coil; and a circuit portion configured to control power supplied to the coil portion, the circuit portion being electrically connected to the coil portion.

The coil portion and the circuit portion may have the form of a thin plate and may be embedded in the external cover to overlap each other.

The auxiliary cover may be detachably coupled to the internal cover.

According to another general aspect, a wireless charging device for a vehicle, includes an external cover configured to open and close proximate an opening of an accommodation space; an internal cover configured to support a power receiving device formed on an internal face of the external cover; at least one auxiliary cover inserted into a space between the internal cover and the external cover and configured to support a power receiving device such that the power receiving device is in planar contact with the internal face of the external cover; and a wireless charging circuit configured to wirelessly transmit power to the power receiving device disposed in the external cover.

According to another general aspect, a variably positioned wireless charging device includes a planar member configured to be pivotally attached to a portion of a vehicle, the planar member including an embedded wireless charging circuit and a wireless transmission coil operably coupled to the wireless charging circuit; and, a portable-terminal retention member, the portable-terminal retention member being configured for adaptive retention of a portable-terminal within a predetermined wireless power reception zone proximate the wireless transmission coil as the planar member pivots through different orientations.

The portable-terminal retention member may include an auxiliary retention member magnetically retained and configured according to a size of the portable terminal.

The portable-terminal retention member may include a deformable member configured to bias the portable terminal into planar contact with a portion of the planar member including the wireless transmission coil.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

A power receiving device according to the example embodiments in the present disclosure may include a portable terminal and may be a collective term for various portable electronic devices such as smartphones, mobile phones, personal digital assistants (PDA), MP3 players, tablet personal computers (PC), and portable multimedia players (PMP).

In addition, although the case in which a wireless charging device for a vehicle is positioned below a center fascia of a vehicle is illustrated according to the example embodiments, such positioning is merely an example, is not limited thereto, and may be formed in various positions in other center consoles, armrests, dash-board, ceiling garage-door holders, and so on.

Figure 1A:
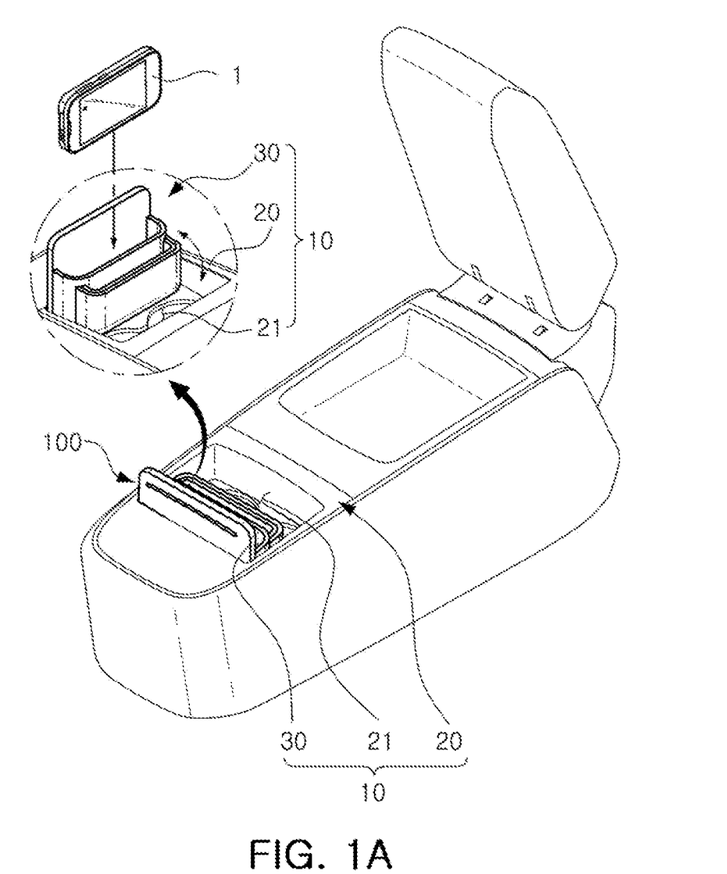
FIG. 1A is a schematic perspective view illustrating a vehicle wireless charging device according to an example embodiment.
Figure 1B:
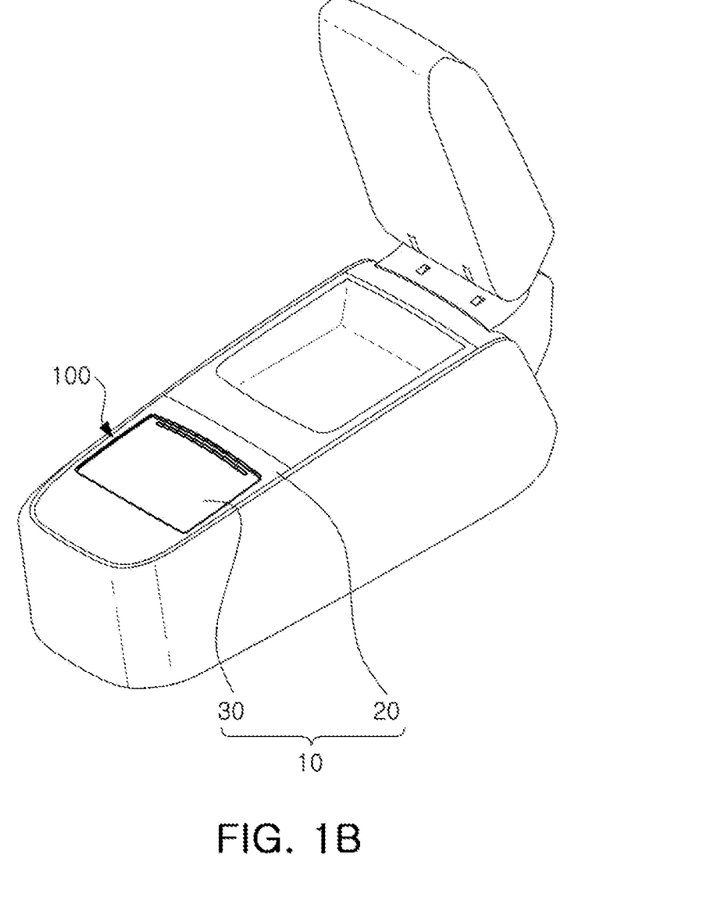
FIG. 1B is a perspective view of the vehicle wireless charging device illustrated in FIG. 1 with a closed cover.

FIG. 1A is a schematic diagram illustrating a vehicle wireless charging device 100 with an opened cover, according to an example embodiment. FIG. 1B is a perspective view of the vehicle wireless charging device 100 with a closed cover illustrated in FIG. 1A.

Figure 2:
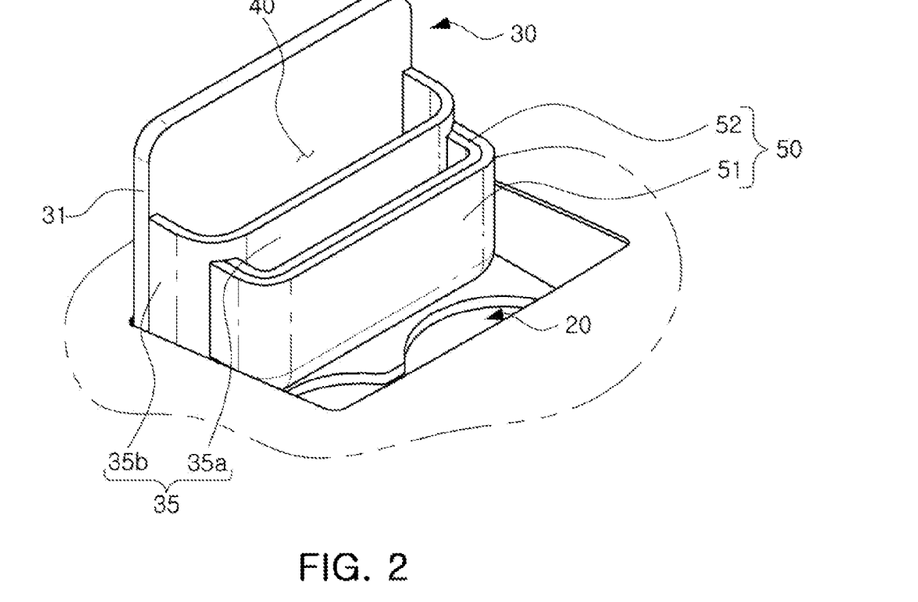
FIG. 2 is a schematic perspective view of a cover of the vehicle wireless charging device illustrated in FIG. 1A.
Figure 3:
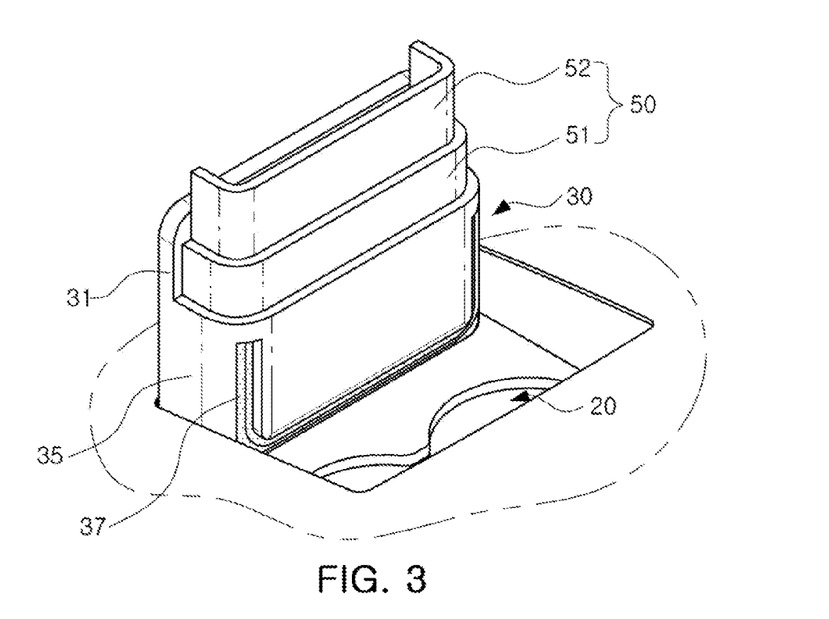
FIGS. 3 and 4 are exploded perspective views of the vehicle wireless charging device of FIG. 2.
Figure 4:
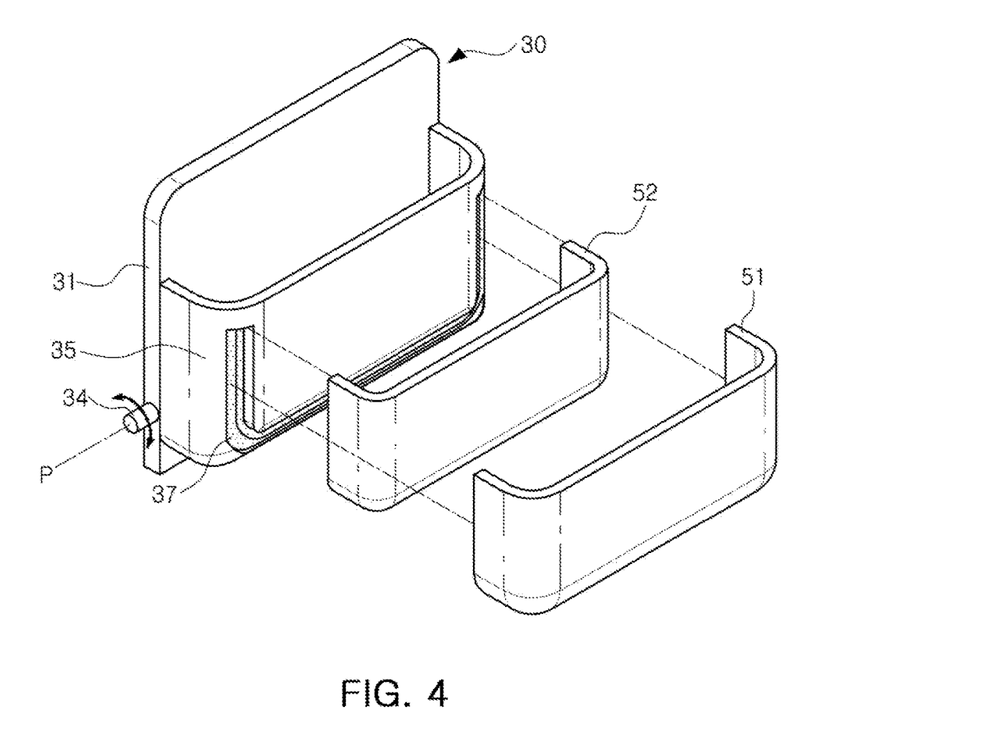

FIG. 2 is a schematic perspective view of a cover of the vehicle wireless charging device 100 illustrated in FIG. 1A. FIGS. 3 and 4 are exploded perspective views of the vehicle wireless charging device 100 of FIG. 2.

Referring to FIGS. 1A through 4, the vehicle wireless charging device 100 according to the example embodiment in the present disclosure may be configured as a portion of an accommodation assembly 10.

The accommodation assembly 10 may be installed on a member in the vehicle. Here, an internal vehicle member may be various structures such as a center fascia, a center console, and an armrest of the vehicle.

The accommodation assembly 10 may include an mounting portion 21 for accommodation of an object, and for example, the accommodation assembly 10 according to the example embodiment in the present disclosure may be a cup holder unit in which a cup is accommodated.

The accommodation assembly 10 according to the example embodiment in the present disclosure may include an accommodation space 20 and a cover 30. The vehicle wireless charging device 100 according to the example embodiment in the present disclosure may be integrally formed with the cover 30 of the accommodation assembly 10. Accordingly, the cover 30 of the accommodation assembly 10 may be understood as a portion of the vehicle wireless charging device 100.

The accommodation assembly 10 may be installed in an internal vehicle member. Here, the internal vehicle member may be various structures such as a center fascia, a center console, and an armrest of the vehicle, or any suitably accessible area for a driver or passenger of the vehicle.

The accommodation space 20 may include the mounting portion 21 for accommodation of an object such as a cup.

The cover 30 may be coupled to the accommodation space 20 at an opening portion of the mounting portion 21. The cover 30 may be coupled to the accommodation space 20 to open and close the opening of the mounting portion 21. For example, the cover 30 may be coupled to the accommodation space 20 to be rotated by a hinge joint. In this case, the cover 30 may be rotated using a hinge 34 (refer to FIG. 4) as a rotation axis P to open and close the opening of the mounting portion 21.

The cover 30 may be configured to be opened and closed via manual manipulation, without being limited thereto, and thus the cover 30 may be configured to be automatically opened and closed using a driving unit such as a motor.

The cover 30 according to the example embodiment in the present disclosure includes an external cover 31, an internal cover 35, and at least one auxiliary cover 50.

When the cover 30 is closed in the accommodation space 20, the external cover 31 is externally exposed. For example, the external cover 31 may be a plate disposed at an outermost portion of the cover 30.

The external cover 31 may include a wireless charging module 60 (refer to FIG. 7) disposed therein. The wireless charging module 60 may wirelessly transmit energy to charge a battery of a portable terminal 1.

The wireless charging module 60 may be embedded in the external cover 31. For example, the wireless charging module 60 may be completely embedded in the external cover 31 so as not to be visible to the naked eye, without being limited thereto. As necessary, the wireless charging module 60 may be partially exposed.

Figure 7:
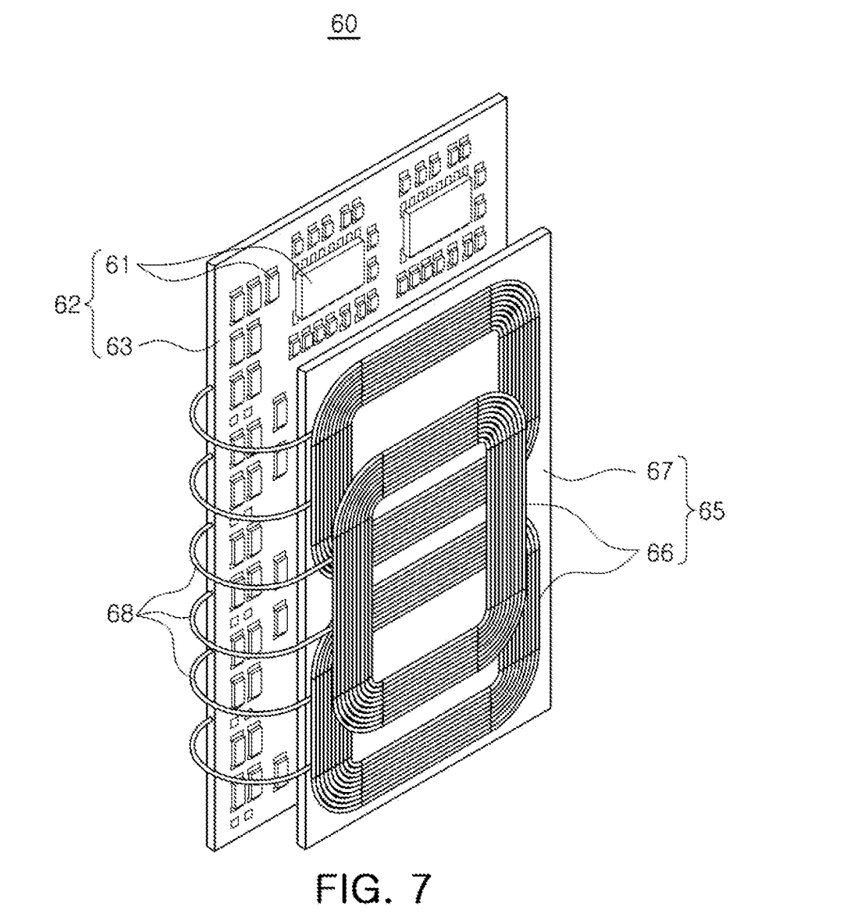
FIG. 7 is a schematic perspective view of a wireless charging module according to an example embodiment.

FIG. 6 is a schematic perspective view of the wireless charging module 60 according to an example embodiment. With reference to the drawings together, the wireless charging module 60 is formed with a coil portion 65 including at least one coil 66 and a circuit portion 62 for supplying current to the coil portion 65.

The coil portion 65 may form a magnetic field and radiate wireless power responsive to control by the circuit portion 62. To this end, the coil portion 65 may be configured by attaching one or more coils 66 on a substrate 67. Here, the coils 66 are wire-type coils, without being limited thereto, and thus various modifications may be made, and for example, the coils 66 may be formed in the form of conductive pattern on a substrate or may use coils formed as a rectangular copper wire.

The circuit portion 62 may be formed by installing a plurality of electronic components 61 on a circuit substrate 63 and may include a circuit for control of charging. Accordingly, the coil portion 65 may radiate power and transmit the power to one or more portable terminals 1 according to control of the circuit portion 62.

The circuit portion 62 may be electrically connected to the coil portion 65 through a connection portion 68. In this case, the connection portion 68 may be formed as a wired type, conductive line, or a flexible substrate. The circuit portion 62 may be coupled to the vehicle's power bus, a battery, or alternator for rectifying and adapting power from a first voltage and current to a second voltage and current to be fed to the coil portion 65 for charging one or more portable terminals 1.

The wireless charging module 60 according to the example embodiment in the present disclosure may be configured in such a manner that the circuit portion 62 and the coil portion 65 respectively have the form of a thin plate and are embedded in the external cover 31 to be stacked on each other and to overlap each other, as illustrated in FIG. 3. In this case, the wireless charging module 60 may be embedded in the external cover 31 to dispose the coils 66 of the coil portion 65 at a side of an internal surface of the external cover 31, that is, at a side of an insertion space 40. However, in some configurations, coils may be arranged on both sides of the external cover 31.

Accordingly, an overall area of the wireless charging module 60 may correspond to an area of the circuit portion 62 or the coil portion 65, and a thickness of the wireless charging module 60 may be constituted by a total thickness of the circuit portion 62 and the coil portion 65.

As the circuit portion 62 and the coil portion 65 are embedded in the external cover 31 to overlap each other, the wireless charging module 60 may be disposed in the external cover 31 without enlargement of an area of a conventional cup holder unit cover.

Meanwhile, due to the thickness of the wireless charging module 60, the thickness of the external cover 31 may be increased. However, the thickness of the external cover 31 may be reduced by minimizing the thickness of the wireless charging module 60, for example, forming the coil portion 65 as a thin film coil.

The internal cover 35 may be disposed inside the external cover 31, and when the cover 30 is closed in the accommodation space 20, the internal cover 35 may be disposed in or to abut against the mounting portion 21.

The internal cover 35 may be integrally formed with the external cover 31 via injection molding, without being limited thereto, and thus the internal cover 35 may be separately manufactured from the external cover 31 and then coupled to the external cover 31.

The insertion space 40 into which the portable terminal 1 is inserted is formed between the internal cover 35 and the external cover 31.

In this case, a distance between the internal cover 35 and the external cover 31 is greater than a maximum thickness of the portable terminal 1 to be wirelessly charged, inserted into the insertion space 40.

The internal cover 35 may include a plate portion 35a disposed in parallel to the external cover 31 and a lateral portion 35b extending toward the external cover 31 from opposite sides of the plate portion 35a to be connected to the external cover 31.

The auxiliary cover 50 may be inserted into the insertion space 40 formed between the internal cover 35 and the external cover 31 to reduce a distance between the internal cover 35 and the external cover 31.

Accordingly, the auxiliary cover 50 may be formed to have a size able to be inserted into the insertion space 40, formed to have a similar shape to that of the internal cover 35, and inserted into the insertion space 40 to reduce the insertion space 40 adaptively to be sized according to the portable terminal 1 or other electronic device to receive charging in alignment with the coils.

The auxiliary cover 50 according to the example embodiment in the present disclosure may include a first auxiliary cover 51 and a second auxiliary cover 52 are coupled to overlap each other. For example, the second auxiliary cover 52 is formed with a smaller size than the first auxiliary cover 51 to be accommodated in an internal space of the first auxiliary cover 51. In addition, the second auxiliary cover 52 may have an external surface with a similar size to an internal surface of the first auxiliary cover 51 to contact the first auxiliary cover 51 in a planar contact arrangement.

Both of the auxiliary covers 51 and 52 may be simultaneously inserted into the insertion space 40. Although the internal cover 35 includes only the two auxiliary covers 51 and 52 according to the example embodiment in the present disclosure, the internal cover 35 is not limited to the configuration. For example, the internal cover 35 may further include third and fourth auxiliary covers coupled to an internal space of the second auxiliary cover 52.

The auxiliary cover 50 may be selectively used according to the thickness of the portable terminal 1.

Figure 6A:
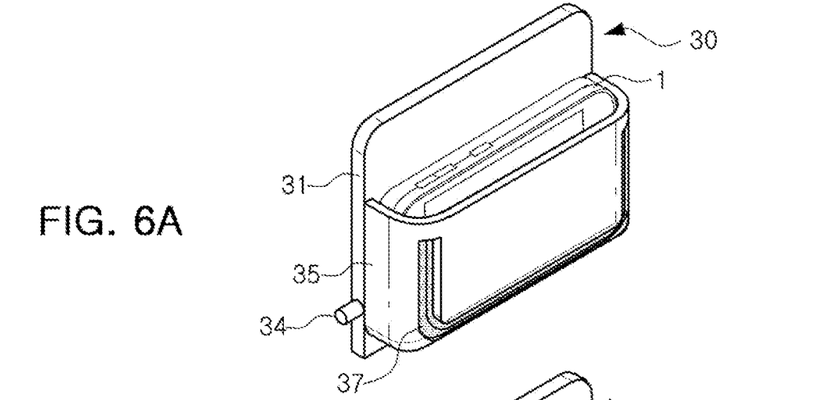
FIG. 6A to 6C are diagrams illustrating examples of uses of auxiliary covers according to an example embodiment.
Figure 6B:
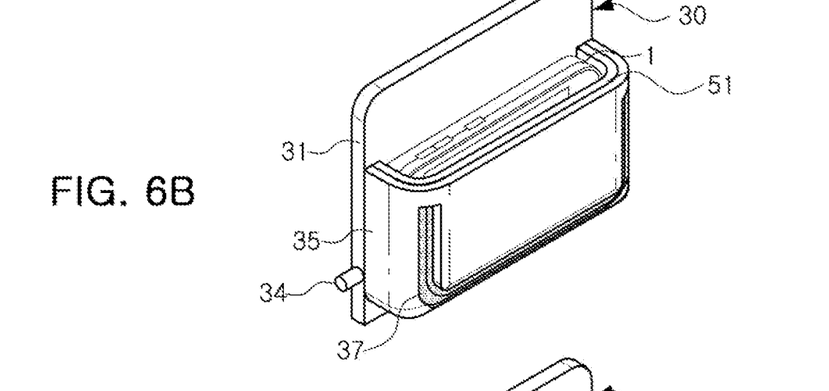

FIG. 6A illustrates the case in which a very thick portable terminal 1 is used as a wireless charging device according to an embodiment. FIG. 6B illustrates the case in which a thinner portable terminal 1 than in FIG. 6A is used. In addition, FIG. 6C illustrates the case in which a thinner portable terminal than in the FIG. 6B is used.

Referring to FIG. 6A, when the portable terminal 1 is very thick, the portable terminal 1 may be inserted into an insertion space without the auxiliary cover 50.

However, as illustrated in FIG. 6B, when the thickness of the portable terminal 1 is somewhat thin, the first auxiliary cover 51 may be inserted into the insertion space 40 to reduce the insertion space 40.

Figure 6C:
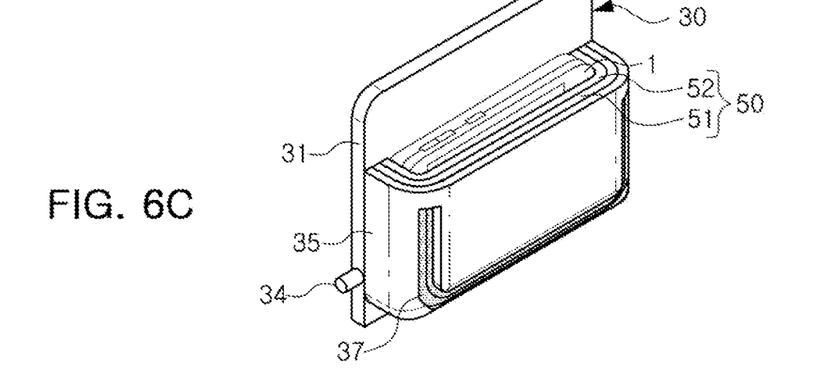

In addition, as illustrated in FIG. 6C, when the thickness of the portable terminal 1 is very thin, the second auxiliary cover 52 together with the first auxiliary cover 51 may be inserted into the insertion space 40 to further reduce the insertion space 40. Accordingly, due to a thin thickness of the portable terminal 1, the portable terminal 1 may be prevented from being moved or shaken rather than being fixed in the insertion space 40.

When the auxiliary cover 50 according to the example embodiment in the present disclosure is not used, the auxiliary cover 50 may be coupled to and maintained in a cover coupler 37 of the internal cover 35, as illustrated in FIG. 2.

As illustrated in FIG. 4, the cover coupler 37 is formed on an external surface of the internal cover 35.

The auxiliary cover 50 according to the example embodiment may be attached to the internal cover 35 using magnetic attraction. Accordingly, the cover coupler 37 may be formed with an attached magnet along a contact surface of the auxiliary cover 50. In addition, in response to this, as illustrated in FIG. 5, an adhesive member 51a such as a magnet or metal member may be disposed on a contact surface of the auxiliary cover 50, which is in planar contact with the cover coupler 37.

Accordingly, the auxiliary cover 50 may be easily attached to the cover coupler 37 of the internal cover 35 according to magnetic attraction, and as necessary, may be easily separated from the internal cover 35 to be inserted into the insertion space 40.

According to the example embodiment, a magnet is disposed on the cover coupler 37, without being limited thereto, and thus various modifications may be made, and for example, metal may be disposed on the cover coupler 37 and a magnet may be formed as an adhesive member of the auxiliary cover 50.

Figure 5:
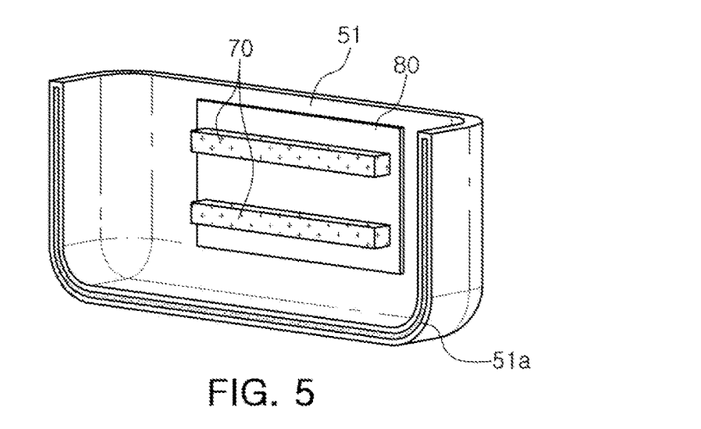
FIG. 5 is a perspective view of an auxiliary cover illustrated in FIG. 4 viewed in a different direction.

As illustrated in FIG. 5, the wireless charging device 100 according to the example embodiment in the present disclosure may include a buffer member 70 disposed on the external cover 31, the internal cover 35, and the internal surface of the auxiliary cover 50. Although FIG. 5 illustrates only an internal surface of the first auxiliary cover 51, the case of FIG. 5 may also be applied to the external cover 31, the first auxiliary cover 51, the internal cover 35, or the like in the same manner.

The buffer member 70 may be attached to the external cover 31 or the internal cover 35, or an internal surface of the auxiliary cover 50 to prevent the portable terminal 1 from sliding out of alignment with the charging coil(s) and to prevent the portable terminal 1 from being damaged.

Accordingly, the buffer member 70 may be formed and attached in the form of a pad, a block, or a band formed of rubber or sponge, without being limited thereto.

In addition, a magnetic portion 80 may be disposed on the internal cover 35 or an internal surface of the auxiliary cover 50 according to example embodiment in the present disclosure. The magnetic portion 80 may be formed of various materials as long as the materials are magnetic, like ferrite, to easily form a magnetic path and formed in the form of a thin sheet to be attached to the internal cover 35 or the internal surface of the auxiliary cover 50.

Here, the internal cover 35 or the internal surface of the auxiliary cover 50 may refer to surfaces that contact or are adjacently disposed to the portable terminal when the portable terminal is inserted into the insertion space 40 (refer to FIG. 2).

Accordingly, the magnetic portion 80 may contact the portable terminal 1 in planar or laminar arrangement to provide a magnetic path, thereby minimizing leakage flux.

FIG. 5 illustrate the case in which the magnetic portion 80 is disposed on the internal cover 35 or the internal surface of the auxiliary cover 50 and the buffer member 70 is disposed on the magnetic portion 80. However, the case according to the example embodiment is not limited to FIG. 5, and various modifications may be made. For example, only one of the magnetic portion 80 and the buffer member 70 may be disposed on the internal cover 35 or the internal surface of the auxiliary cover 50. In addition, one surface of the magnetic portion 80 may be formed of a buffer member or a through hole may be formed through the magnetic portion 80 and the buffer member 70 may be formed in the through hole.

The above configured vehicle wireless charging device according to the example embodiments may wirelessly charge a battery of a portable terminal while accommodating the portable terminal in a cup holder cover installed in most vehicles to effectively use a space in the vehicle. In addition, the portable terminal may be fixedly held so as not to be shaken, thereby enhancing charging efficiency.

An insertion space having various sizes may be provided, and thus various types of portable terminals may be easily charged irrespective of a thickness thereof.

A wireless charging device according to embodiments in the present disclosure is not limited to the aforementioned embodiments, and thus various modifications may be made.

Figure 8:
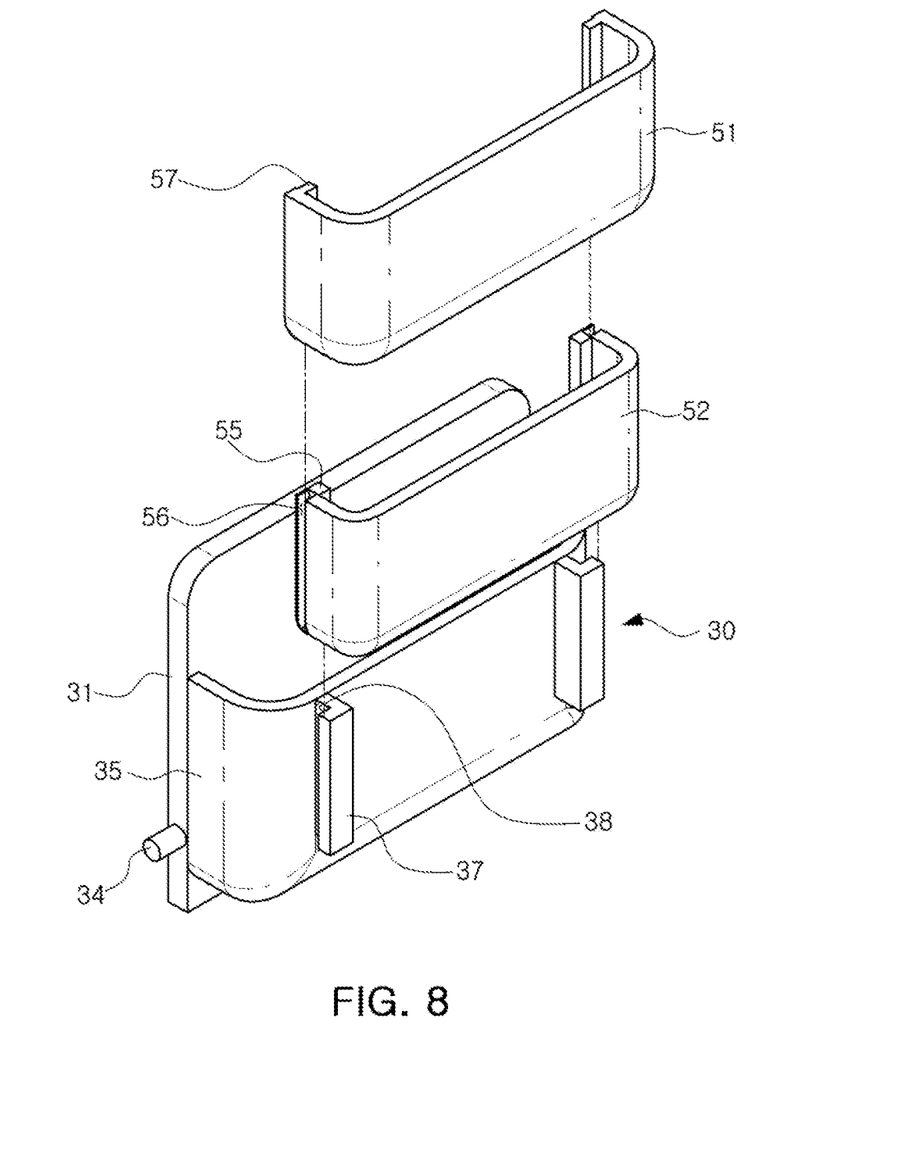
FIG. 8 is a schematic perspective view of a wireless charging device for a vehicle according to another example embodiment.

FIG. 8 is a schematic exploded perspective view of a wireless charging device according to another example embodiment in the present disclosure.

Referring to FIG. 8, the wireless charging device according to an example embodiment may be configured in such a manner that the auxiliary covers 51 and 52 are coupled to the internal cover 35 in a sliding manner.

To this end, the coupler 37 protruding outward is formed on the internal cover 35. The coupler 37 is configured in such a manner that an insertion groove 38 into which a coupling block 55 of the second auxiliary cover 52 is inserted is longitudinally formed in a plane direction of the internal cover 35.

The coupling block 55 inserted into the insertion groove 38 protrudes inwardly from a lateral portion of the second auxiliary cover 52 in the second auxiliary cover 52. One coupling block 55 may be formed or alternatively, a plurality of blocks that are spaced apart from each other may be formed.

An insertion groove 56 is formed in the second auxiliary cover 52. The second auxiliary cover 52 may be configured in such a manner that the insertion groove 56 is disposed in parallel to the insertion groove 38 of the internal cover 35.

Likewise, a coupling block 57 inserted into the insertion groove 56 of the second auxiliary cover 52 protrudes inwardly from a lateral portion of the first auxiliary cover 51.

Via such a configuration, the first auxiliary cover 51 may be slide-coupled to the second auxiliary cover 52, and the second auxiliary cover 52 may integrally slide-coupled to the internal cover 35.

An auxiliary cover coupling structure of a wireless charging device according to embodiments is not limited to the above structure. For example, various modifications may be made as necessary, and for example, a protrusion or a ring may be formed on the auxiliary cover 50, a hole or a groove may be formed in the internal cover 35, and then the protrusion or the ring and the hole or the groove may be inserted into each other.

As set forth above, according to example embodiments, a battery of the portable terminal 1 may be wirelessly charged while the portable terminal 1 is accommodated in a cup holder cover to effectively use a space in the vehicle, and the portable terminal may be stably and fixedly held to enhance charging efficiency.

In addition, an insertion space with various sizes may be provided, and thus various types of portable terminals may be easily charged irrespective of a thickness of the portable terminal.

The apparatuses, units, modules, devices, and other components (e.g. circuit portion 62) illustrated in FIG. 7 that perform the wireless charging described herein are implemented by hardware components. Examples of hardware components include controllers, sensors, generators, drivers, rectifiers, power supplies, logic, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions (or in the case of analog logic responding to stimuli such as a change in voltage, current, capacitance, resistance, or frequency) in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the charging operation described herein. The hardware components may also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a portable terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless charging device, comprising:
   an external cover rotatably coupled to a member and including a wireless charging circuit formed therein;
   an internal cover coupled to a surface of the external cover and including an accommodation space configured to position a power receiving device in a power receiving position with respect to the wireless charging circuit to receive power transmitted by the wireless charging circuit;
   at least one auxiliary cover configured to be inserted into the accommodation space to inhibit movement of the power receiving device; and
   a cover coupler formed on an external surface of the internal cover and configured to retain the at least one auxiliary cover when the at least one auxiliary cover is not disposed in the accommodation space.

2. The wireless charging device of claim 1, wherein a plurality of auxiliary covers are configured to correspond to a thickness of the power receiving device in the accommodation space.

3. The wireless charging device of claim 2, further comprising:
   a magnet or metal member having a shape substantially of the auxiliary cover is disposed on the cover coupler; and
   the auxiliary cover being attached to the cover coupler according to magnetic attraction.

4. The wireless charging device of claim 3, wherein a magnet or metal member is disposed on a contact surface of the auxiliary cover, contacting the cover coupler.

5. The wireless charging device of claim 1, wherein the auxiliary cover is formed to have a similar shape to that of the internal cover and includes a first auxiliary cover, and a second auxiliary cover formed to have a size able to be accommodated in an internal space of the first auxiliary cover.

6. The wireless charging device of claim 5, wherein the first auxiliary cover has an internal space in planar contact with an external surface of the second auxiliary cover when the second auxiliary cover is accommodated in the internal space of the first auxiliary cover.

7. The wireless charging device of claim 1, wherein the internal cover and the auxiliary cover each have an internal surface on which a buffer member is disposed.

8. The wireless charging device of claim 1, further comprising a magnetic portion attached to the internal cover or an internal surface of the auxiliary cover.

9. The wireless charging device of claim 8, wherein the magnetic portion is formed of a ferrite sheet.

10. The wireless charging device of claim 8, wherein the magnetic portion is configured to decrease a leakage flux between the wireless charging circuit and the power receiving device.

11. The wireless charging device of claim 1, wherein the wireless charging circuit includes:
    a coil portion including at least one coil; and
    a circuit portion configured to control power supplied to the coil portion, the circuit portion being electrically connected to the coil portion.

12. The wireless charging device of claim 11, wherein the coil portion and the circuit portion have the form of a thin plate and are embedded in the external cover to overlap each other.

13. The wireless charging device of claim 1, wherein the auxiliary cover is detachably coupled to the internal cover.

14. The wireless charging device of claim 1, wherein the member is an interior member of a vehicle.

15. A wireless charging device, comprising:
    an external cover configured to open and close proximate an opening of an accommodation space;
    an internal cover configured to support a power receiving device formed on an internal face of the external cover;

at least one auxiliary cover inserted into a space between the internal cover and the external cover and configured to support a power receiving device such that the power receiving device is in planar contact with the internal face of the external cover;

a cover coupler formed on an external surface of the internal cover and configured to retain the at least one auxiliary cover; and a wireless charging circuit configured to wirelessly transmit power to the power receiving device disposed in the external cover.

16. A variably positioned wireless charging device comprising:

a planar member configured to be pivotally attached to a portion of a vehicle, the planar member including an embedded wireless charging circuit and a wireless transmission coil operably coupled to the wireless charging circuit;

a portable-terminal retention member, the portable-terminal retention member being configured for adaptive retention of a portable-terminal within a predetermined wireless power reception zone proximate the wireless transmission coil as the planar member pivots through different orientations; and an auxiliary retention member configured to be inserted into an inside of the portable-terminal retention member and to attach to an external surface of the portable-terminal retention member.

17. The variably positioned wireless charging device of claim 16, wherein the auxiliary retention member is magnetically retained and configured according to a size of the portable terminal.

18. The variably positioned wireless charging device of claim 17, wherein the portable-terminal retention member includes a deformable member configured to bias the portable terminal into planar contact with a portion of the planar member including the wireless transmission coil.

* * * * *